United States Patent
Langsdorf et al.

(10) Patent No.: US 6,829,909 B2
(45) Date of Patent: Dec. 14, 2004

(54) METHOD FOR HEATING GLASS SEMI-FINISHED PRODUCTS ABOVE THE ADHESION TEMPERATURE

(75) Inventors: Andreas Langsdorf, Frankfurt (DE); Hildegard Romer, Karben (DE)

(73) Assignee: Schott Glas, Mainz (DE)

( * ) Notice: Subject to any disclaimer, the term of this patent is extended or adjusted under 35 U.S.C. 154(b) by 473 days.

(21) Appl. No.: 09/952,237

(22) Filed: Sep. 10, 2001

(65) Prior Publication Data

US 2002/0029589 A1 Mar. 14, 2002

(30) Foreign Application Priority Data

Sep. 14, 2000 (DE) .......................................... 100 45 373

(51) Int. Cl.[7] .............................................. C03B 40/02
(52) U.S. Cl. ........................... 65/25.1; 65/169; 65/182.2
(58) Field of Search ........................ 65/25.1, 169, 170, 65/182.2

(56) References Cited

U.S. PATENT DOCUMENTS

| 1,638,593 | A | * | 8/1927 | Mulholland ................. 65/25.1 |
| 2,911,669 | A | * | 11/1959 | Beckwith ..................... 264/15 |
| 3,961,927 | A | * | 6/1976 | Alderson et al. ............ 65/25.1 |
| 4,546,811 | A |   | 10/1985 | Potard |
| 5,324,345 | A | * | 6/1994 | Rutjes et al. .................. 65/64 |
| 5,656,053 | A |   | 8/1997 | Boaz |
| 5,873,921 | A | * | 2/1999 | Hirota et al. ................. 65/25.1 |
| 5,987,922 | A | * | 11/1999 | Hirota et al. .................. 65/64 |
| 6,408,649 | B1 | * | 6/2002 | Sklyarevich et al. .......... 65/102 |
| 6,497,119 | B1 | * | 12/2002 | Hartel et al. ............... 65/29.14 |

FOREIGN PATENT DOCUMENTS

| EP | 0 761 612 | 3/1997 |
| EP | 0 761 613 A2 | 3/1997 |
| EP | 0 761 614 | 3/1997 |
| JP | 6-114146 | 4/1994 |

* cited by examiner

Primary Examiner—Sean Vincent
(74) Attorney, Agent, or Firm—Merchant & Gould P.C.

(57) ABSTRACT

The invention relates to a method for heating up and shaping a preform consisting of glass or glass ceramic. According to the invention, a preform, formed using conventional methods, is heated to a temperature that is below the adhesion temperature of the gas, i.e. to below critical viscosity; in a second heating phase the preform is put into a hovering state through the supply of levitation gas; in the hovering state the preform is heated by a microwave heating apparatus to a temperature that permits its shaping; and the preform is delivered to a shaping station.

6 Claims, 1 Drawing Sheet

METHOD FOR HEATING GLASS SEMI-FINISHED PRODUCTS ABOVE THE ADHESION TEMPERATURE

Figure 1:
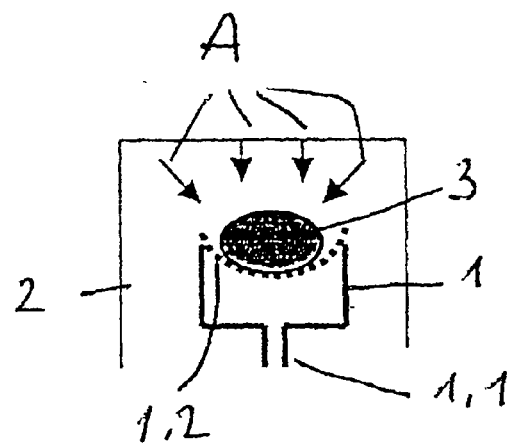

The invention relates to the production of a molded article from glass or glass ceramic.

It is known that in the shaping of a molded article from glass, in a certain temperature region or viscosity region the glass becomes sticky. With this, the glass adheres firmly to the mold. The critical viscosity lies at approximately $10^8$ dPas.

EP 070 760 A1 shows and describes a method as well as a device for producing a molded article from glass. Here, a lump of the hot, molten mass is transferred into a mold. The walls of the mold are porous. The pores are linked by gas connections so as to be conductive. If gas is introduced into the connections, then this gas emerges from the pores and prevents contact between the glass and the inner surfaces of the mold walls.

The mold just mentioned, a so-called levitation mold, has a temperature that, in general, lies below the critical adhesion temperature of the glass. In this case, by virtue of the heat content in the glass lump, a certain temperature difference between the levitation mold and the glass lump can be tolerated.

It is not always desired to transfer the hot molten mass immediately into a levitation mold. One often wishes, instead of this, to first produce preforms from glass, and to then heat these up in a levitation mold, in order to give them there a final shape. This means that the preform must be heated in the levitation mold itself. See, for example, JP 61/14146. The preform is thus brought in a cold state into the levitation mold. There, it must be heated to a shaping temperature, which requires considerable amounts of heat and relatively long time periods. During the heating up, the temperature of the preform passes through the critical zone. In this, there exists the danger of an adhering of the glass to the walls of the mold container, regardless of the fact that the preform hovers due to the gas.

The invention is based on the task of bringing a preform, which is present in a cold state, to a shaping temperature and forming it in a shaping machine without the danger of an adhesion.

This task is accomplished through the features of the independent claims.

In this, the inventors have reached a manner of solution that is equally simple and correct. Accordingly, they propose, first of all, to produce the preform in the conventional manner, to transfer it into a levitation mold, to preheat it in the levitation mold to a temperature that lies below the adhesion temperature of the glass, then to apply a heat impulse to the preform, by means of microwave action with simultaneous gas feed, so that the preform is in a state of hovering, and finally—after exceeding the critical adhesion temperature and reaching the desired shaping temperature—to transfer the preform into a shaping machine.

The heating up of the preform thus takes place in two phases. In the first heating phase, the preform is heated to a temperature that lies below the critical adhesion temperature. In the second heating phase, the adhesion temperature is exceeded and the higher temperature necessary for the shaping is reached.

The invention is associated with the following advantages:

The first heating phase of the preform causes no kind of technical problems. The manner and duration of the first heating phase are unimportant and thus unproblematic. During the first heating phase no gas levitation is needed.

The second heating phase, by virtue of the choice of the heating means (namely, a microwave resonator), takes place extremely quickly. This second heating phase requires only a few seconds. Thus, no long holding times on the gas levitation membrane are necessary. Possible contacts between the preform and wall of the mold are so minimal, if present at all, that adhesions do not occur or only to the least degree.

The amount of gas necessary for the levitation is small, due to the short time span of the second heating phase.

The energy loss consequent of the transfer of heat from the now very hot preform to the relatively cool surrounding (membrane) is likewise small, due to the short time span of the second heating phase.

In contrast to the prior art, only the preform is heated, but not the surrounding, and thus also the membrane of the mold, so that a further energy saving results, in comparison to conventional methods and devices.

The levitation mold can be kept below the adhesion temperature, so that short-term contacts between mold and glass are also uncritical.

The two elements according to the invention—levitation on the one hand, and application of the microwave heating on the other hand—are decisively important in their combination. If one were to carry out the heating up only with microwave heating on a conventional mold (without levitation), then the adhesion problem would arise, since in this case the mold assumes, by means of heat conduction, the temperature of the product to be heated up. Since the adhesion viscosity ($10^8$ dPas) lies distinctly above the processing viscosity ($10^4$ dPas) necessary for greater reshaping, the problem of heating up in mold contact is incapable of solution.

The invention is described with the aid of the drawings. In them, three decisive phases of the heating process according to the invention are illustrated.

FIG. 1: illustrates the first heating phase of a preform in a levitation mold, with contact between the glass and the mold.

Figure 2:
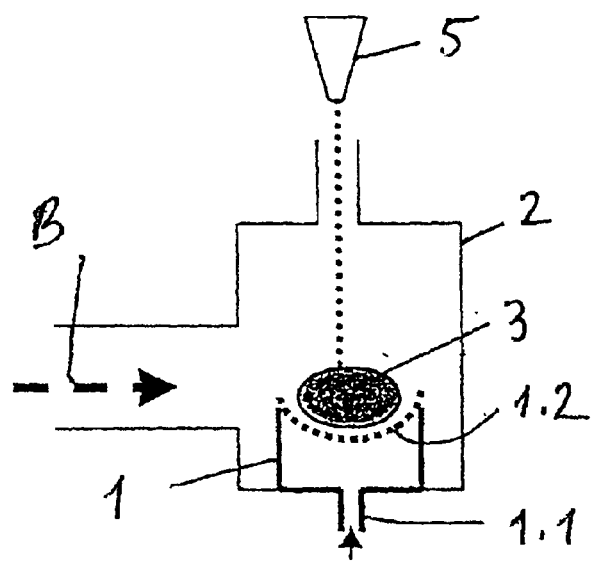

FIG. 2: illustrates the second heating phase of the preform, with gas feed and action of microwave radiation.

Figure 3:
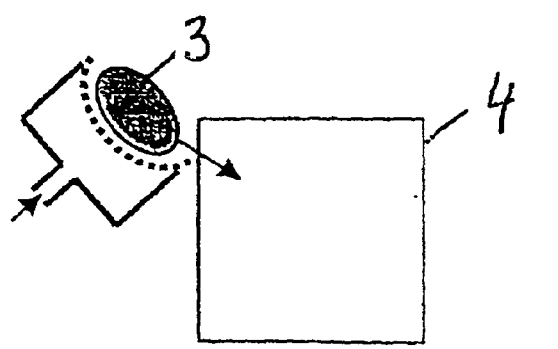

FIG. 3: illustrates the delivering of the preform, heated to a high temperature, from the levitation mold to a shaping machine.

In the three figures, one recognizes a levitation mold 1. This displays a gas connection 1.1, also a membrane 1.2. The membrane is the present case a concave, porous wall. The pores of the wall 1.2 are linked to the gas connection 1.1 in a conductive manner. The gas connection 1.1 is provided with a valve, which is not represented here.

The levitation mold 1 is surrounded by a housing 2.

Upon the membrane is situated a preform 3 of glass. The preform 3 has the shape of an ellipsoid.

The arrow A in FIG. 1 illustrates the influx of heat. Here, this preform 3 (glass semi-finished product) is heated in any conventional manner to a temperature that corresponds to a viscosity of approximately $10^{10}$ dPas. This viscosity lies below the adhesion temperature.

According to FIG. 2, the preform 3 is again situated upon the membrane 1.2 of a levitation mold 1. Here, the levitation mold 1 according to FIG. 1 can be identical with the levitation mold 1 according to FIG. 2. Thus, the preform 3 can, after the first heating phase as represented in FIG. 1, remain on the same levitation mold 1. However, a transfer to a second levitation mold is also conceivable. In this case, the first mold 1 could also be a conventional mold without the possibility of a levitation.

In the phase of the process represented in FIG. 2, the second heating takes place. The preform is subjected to the effect of microwave radiation—see arrow B.

For this additional heating, the product is heated with microwaves. For this purpose, either a single-mode or multi-mode resonator can be used. For smaller geometries with up to 10 cm maximum dimensions, a single-mode resonator appears to be preferable, since with this a higher degree of effectiveness can be attained. For larger glass semi-finished products, a multi-mode resonator seems to be preferable, due to the better field homogeneity.

In the second heating phase, the preform 3 is now heated by means of microwaves to the required viscosity of $10^4$ dPas. It has, due to the gas cushion, no contact with the mold. In the case of application of a single-mode resonator and a semi-finished product mass of 200 g, the required temperature can be achieved in fewer than 20 seconds by applying microwave power in the range of 2 to 3 kW.

As one can see, associated with the housing 2 is a pyrometer 5.

FIG. 3 illustrates the last phase of the process. Here, the preform 3, by now heated to its final temperature, is delivered from the levitation mold 1 to a shaping machine 4, where it obtains its final shape.

The porous material of the levitation mold consists preferably of SiC or C. Both materials are characterized by the fact that they absorb microwaves more weakly than the glass in the temperature range of interest, and that they have a field-homogenizing rather than field-focusing effect for the microwaves and positively aid the heating with respect to temperature homogeneity and field intensity. Also, other porous materials that absorb the microwave radiation more weakly than the glass itself correspond to the concepts of the invention.

The mentioned concave or trough-shaped form of the membrane 1.2 allows the glass to be held in a largely liquid or doughy state in the form of a drop, while preventing the latter from running out.

It is an accomplishment of the inventor to have recognized that the microwave action illustrated in FIG. 2 covers completely and fully the preform, regardless of the mentioned trough shape of the membrane. Thus, there exists no problem with respect to a lack of concentration of the microwave energy in the trough area.

As the levitation gas, coming into consideration is an inert gas that behaves unobtrusively in relation to the material of the glass as well as the material of the levitation mold, in particular in relation to material of the membrane.

Regarding the possibilities of the design of the microwave heating apparatus, reference is made to the following publications: EP 761 612 A1, EP 761 613 A1, EP 761 614 A1 and U.S. Pat. No. 5,656,053.

What is claimed is:

1. Method for heating up and shaping a preform consisting of glass;
   the preform is produced in a conventional manner;
   the preform, in a first heating phase, is heated to a temperature that lies below the adhesion temperature of the glass while no levitation gas is supplied;
   the preform, during a second heating phase in a levitation mold is put into a hovering state through the supplying of levitation gas;
   the preform, in its hovering state, is heated by a microwave heating apparatus to a temperature that permits its shaping;
   the preform is delivered to a shaping station.

2. Method according to claim 1, wherein the preform is heated up in the levitation mold during the first heating phase.

3. Device for heating up and shaping a preform, comprising:
   a first mold for receiving the preform;
   a heating apparatus for heating up the preform to a first temperature that is below the adhesion temperature while no levitation gas is supplied;
   a levitation mold for receiving the preform that has been previously heated in the first heating phase;
   a microwave heating apparatus associated with the levitation mold;
   shaping equipment arranged after the levitation mold with microwave heating apparatus.

4. Device according to claim 3, wherein the first mold for receiving the preform is one and the same with the levitation mold.

5. Device according to one of the claims 3, wherein a wall of the mold that receives the preform has a concave shape.

6. The method of claim 1 wherein in the first heating phase the preform stays below a critical viscosity.

* * * * *